United States Patent Office 3,106,387
Patented Oct. 8, 1963

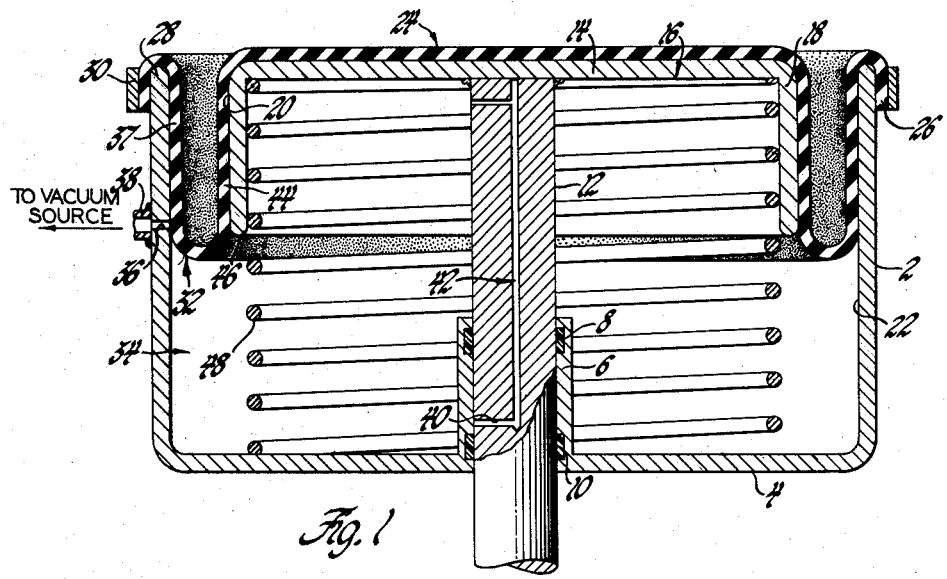

3,106,387
VACUUM SPRING CONSTRUCTION
Philip L. Francis, Pontiac, Mich., assignor to General Motors Corporation, Detroit, Mich., a corporation of Delaware
Filed Feb. 13, 1961, Ser. No. 89,041
4 Claims. (Cl. 267—34)

This invention relates to springs and more particularly to spring construction especially adapted for vacuum actuation.

The present invention is concerned primarily with improvements in vacuum actuated springs of the type shown in my copending application Serial No. 813,160, now Patent No. 2,998,244, entitled "Self-Leveling Fluid Spring," assigned to General Motors Corporation.

Prior art vacuum springs of the piston, cylinder and diaphragm type have generally required a piston in which the depending cylindrical wall portion was considerably longer than the vertical length of the depending convolution of the diaphragm when the spring was in the normal load supporting position, in order to provide lateral support for the inner wall portion of the convolution whenever the piston was displaced substantially axially away from the cylinder. In the absence of sufficient piston depending wall, the diaphragm would collapse inwardly as soon as a substantial portion thereof extended below the lower edge of the piston wall. While a relatively long piston wall serves to overcome the difficulty described insofar as piston movement in the axial outward direction is concerned, the length of the cylinder must also be increased in order to permit reasonable axial inward deflection of the piston from the normal position without bottoming on the cylinder end wall. As a result, in the prior art, vacuum spring assemblies have been inordinantly long in relation to the range of vertical deflection between the piston and cylinder.

An object of the present invention is to provide an improved vacuum spring construction.

Another object is to provide a vacuum spring of the cylinder, piston and diaphragm type which is constructed and arranged in such a way as to substantially reduce the overall vertical dimension of the spring while retaining a range of deflection between the piston and cylinder which is comparable to spring constructions requiring much greater vertical dimension.

A further object is to provide a vacuum spring of the type referred to including expansible means associated with the piston which serve to provide radial support for the diaphragm when the piston is in a deflection position in which a substantial portion of the diaphragm extends below the piston.

A still further object is to provide a vacuum spring comprising a cup-shaped cylinder having a relatively shallow piston reciprocably disposed therein and including a flexible diaphragm connecting the piston and cylinder, the piston including a depending wall portion which is spaced radially inwardly from the cylinder wall and the diaphragm including an intermediate depending convolution occupying the annular interval between the piston wall and cylinder wall, the piston and cylinder having a light coil spring disposed in compression therebetween, the spring being formed so as to reach its mechanical limits of compression when the piston has been downwardly displaced so that the skirt thereof engages the bottom wall of the cylinder.

These and other objects, advantages and features of the invention will become more fully apparent as reference is had to the accompanying specification and drawing wherein:

FIG. 1 is a sectional elevational view of a self-leveling vacuum spring construction in accordance with the invention, showing the relation of the parts when the spring is in the normal load supporting position; and FIG. 2 is a view similar to FIG. 1, showing the relation of the parts when the piston has been displaced substantially upwardly relative to the cylinder.

Referring now to the drawings and particularly FIG. 1, there is shown a vacuum spring assembly in which the reference numeral 2 designates a cylinder having a closed bottom wall 4 formed with a central upwardly extending guide sleeve 6. Guide sleeve 6 preferably carries a pair of vertical seals 8 and 10 which embrace a piston rod 12 reciprocably disposed in the sleeve 6. At its upper end rod 12 is attached, as by welding, to the top wall 14 of an inverted cup-shaped piston 16. Piston 16 includes a shallow downwardly directed annular skirt portion 18, the outer wall 20 of which is spaced substantially radially inwardly from the inner wall 22 of cylinder 2. A relatively thin flexible diaphragm 24 overlies the top wall 14 of piston 16 and is connected at its outer periphery 26 to the upper end 28 of cylinder 2 by an encircling band type clamp 30. Diaphragm 24 includes an intermediate depending single convolution portion 32 which extends downwardly between the outer wall 20 of skirt 18 and the inner cylindrical wall 22. The closed cavity 34 formed by cylinder 2, piston 16 and diaphragm 24 is adapted to be subjected to subatmospheric pressure by the provision of a port 36 in the cylindrical wall 2 which is normally overlapped by the outer wall portion 37 of convolution 32. Port 36 communicates via nipple 38 with a source of vacuum, not shown. As will be apparent, whenever piston 16 rises above the normal position shown in FIG. 1, port 36 is uncovered as the wall portion of the convolution 32 peels away from cylinder wall 22, allowing the level of vacuum to be increased until the piston is restored to the normal position. Conversely, downward movement of the piston from the position shown causes the piston rod to move to a position in which the lower radial branch 40 of a U-shaped passage 42 formed in piston rod 12 communicates with atmosphere, thus allowing vacuum in cavity 34 to bleed to atmosphere through passage 42 until the piston is restored to the normal position.

Owing to the subatmospheric pressure in cavity 34, depending wall portions 37 and 44 of the intermediate convolution 32 are forced into overlapping engagement with the outer wall 20 of the piston and inner cylinder wall 22 by the pressure differential between atmospheric and subatmospheric pressures at opposite sides of the diaphragm. As will be evident from casual inspection of FIG. 1, downward deflection of piston 16 will cause the depending intermediate convolution of the diaphragm to progressively peel off the outer wall 20 of the piston unto the inner wall 22 of the cylinder until the piston has descended to a point wherein the terminal edge 46 of the skirt abuts the bottom wall 4 of cylinder 2. During this entire movement, all portions of the diaphragm are provided with positive radial support by the wall 22 of the cylinder. However, as will be evident from FIG. 2, if the piston is deflected upwardly from the normal position shown in FIG. 1, the peeling action, previously referred to, is reversed and the lower portion of the depending convolution quickly reaches a position in which no radial support is provided by the piston. However, in accordance with the present invention, a large diameter light coil spring 48 is disposed in compression between the top wall 14 of the piston and the bottom wall 4 of the cylinder. Spring 48 is dimensioned so that the diameter thereof is only slightly less than the inside diameter of the piston; hence, radial inward collapsing of the diaphragm depending convolution is arrested by engagement with the individual coils of the spring 48. As a result, the spring assembly is able to function through a range of deflection which is considerably in excess of the vertical dimension of the piston skirt rather than less than such vertical dimension as has been the case in the prior art. For optimum effectiveness, it is desirable that spring 48 be formed of spring wire of a diameter such that the length of the spring, fully collapsed to its mechanical limits, is equal to the depth between the top wall and lower terminal edge of the piston. Under these circumstances, a minimum interval between the individual coils of the spring occurs when the piston is in its maximum upwardly displaced position.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a vacuum spring, a piston and cylinder connected by a rolling lobe diaphragm, said piston having a side wall depth no greater than the vertical extent of said rolling lobe at normal load supporting position, and means providing radial support for said rolling lobe when said piston moves in the rebound deflection direction, said means comprising a radially stiff, axially yieldable helical member disposed between said piston and cylinder on an axis coincident with the deflection axis of said piston.

2. In a vacuum spring, a piston and cylinder connected by a rolling lobe diaphragm, said piston having a side wall depth no greater than the vertical extent of said rolling lobe at normal load supporting position, and collapsible means engaging said piston providing radial support for said rolling lobe when said piston moves in the rebound deflection direction, said means comprising a radially stiff, axially yieldable helical member disposed between said piston and cylinder on an axis coincident with the deflection axis of said piston.

3. In a fluid spring, a cylinder having an open upper end and a closed bottom wall, a guide sleeve secured centrally in said bottom wall, a piston rod reciprocably disposed in said sleeve, an inverted cup-shaped piston having its top wall secured to the upper end of said rod for reciprocable movement in and out of said cylinder, the side wall of said piston being spaced radially inwardly from the side wall of said cylinder to form an annular interval therebetween, a flexible diaphragm overlying said piston and having its outer edge secured to the open end of said cylinder, said diaphragm including an intermediate annular portion forming a depending convolution overlapping the side walls of said piston and cylinder in equal amounts when said piston is in a predetermined normal load supporting position, and a compression spring disposed between the top wall of said piston and the bottom wall of said cylinder, said spring having a diameter closely approximating the inside diameter of said piston side wall, whereby to provide radial outward support for said diaphragm convolution when said piston is displaced upwardly from said normal position.

4. The combination set forth in claim 3 wherein the spring is formed of wire, the diameter of which is such that the spring reaches its mechanical limit of compression when said piston wall engages the bottom wall of said cylinder.

References Cited in the file of this patent
UNITED STATES PATENTS

| | | |
|---|---|---|
| 971,583 | Bell | Oct. 4, 1910 |
| 1,039,537 | Hofmann | Sept. 24, 1912 |
| 2,921,781 | Pemperton | Jan. 19, 1960 |
| 2,933,308 | McGavern | Apr. 19, 1960 |